United States Patent [19]

Chapin et al.

[11] 4,108,127
[45] Aug. 22, 1978

[54] MODULATED THROTTLE BYPASS

[75] Inventors: Leonard Lee Chapin; James Walter Merrick, both of El Paso, Tex.

[73] Assignee: Autotronic Controls, Corp., El Paso, Tex.

[21] Appl. No.: 783,614

[22] Filed: Apr. 1, 1977

[51] Int. Cl.² .................... F02D 1/04; F02D 35/00; F02D 33/00; F02B 15/00
[52] U.S. Cl. .................... 123/124 R; 123/32 EA; 123/119 D; 123/119 EC; 123/124 B
[58] Field of Search ..... 123/119 D, 119 DB, 119 EC, 123/124 B, 124 R, 124 A, 97 B, 139 AW, 32 EA, 32 ED

[56] References Cited
U.S. PATENT DOCUMENTS

| | | | |
|---|---|---|---|
| 3,759,232 | 9/1973 | Wahl et al. | 123/119 DB |
| 3,778,729 | 12/1973 | Ciemochowski | 123/124 B |
| 3,809,028 | 5/1974 | Luchaco | 123/97 B |
| 3,817,225 | 6/1974 | Priegel | 123/32 EA |
| 3,859,541 | 1/1975 | Hattori et al. | 123/97 B |
| 3,964,457 | 6/1976 | Coscia | 123/124 B |
| 4,015,568 | 4/1977 | Horlye | 123/119 D |
| 4,020,813 | 5/1977 | Hattori et al. | 123/119 D |
| 4,036,186 | 7/1977 | Hattori et al. | 123/32 EA |

Primary Examiner—Wendell E. Burns
Attorney, Agent, or Firm—Fitch, Even, Tabin & Luedeka

[57] ABSTRACT

An auxiliary air control system controls the flow of air into the intake manifold of an internal combustion engine. The system controls flow through a valve bypassing the main throttle valve to maintain an appropriate rate of air flow. A manifold pressure signal is fed back to a control circuit for comparison with a manifold pressure reference and development of a manifold pressure control signal for positioning the bypass valve to admit air at a rate maintaining the manifold pressure at the reference pressure and thus avoid low manifold pressures as cause excessive emissions of pollutants. A signal indicative of rate of air flow is fed back to the controller for comparison with an air flow reference and development of an air flow control signal for positioning the bypass valve to admit air at a rate maintaining total air flow at the reference rate, as for engine idle. The control signals are applied to admit air at the greater of the two rates. The air flow reference may be controlled as a function of any or all of engine temperature, added load, main throttle opening and starting.

24 Claims, 5 Drawing Figures

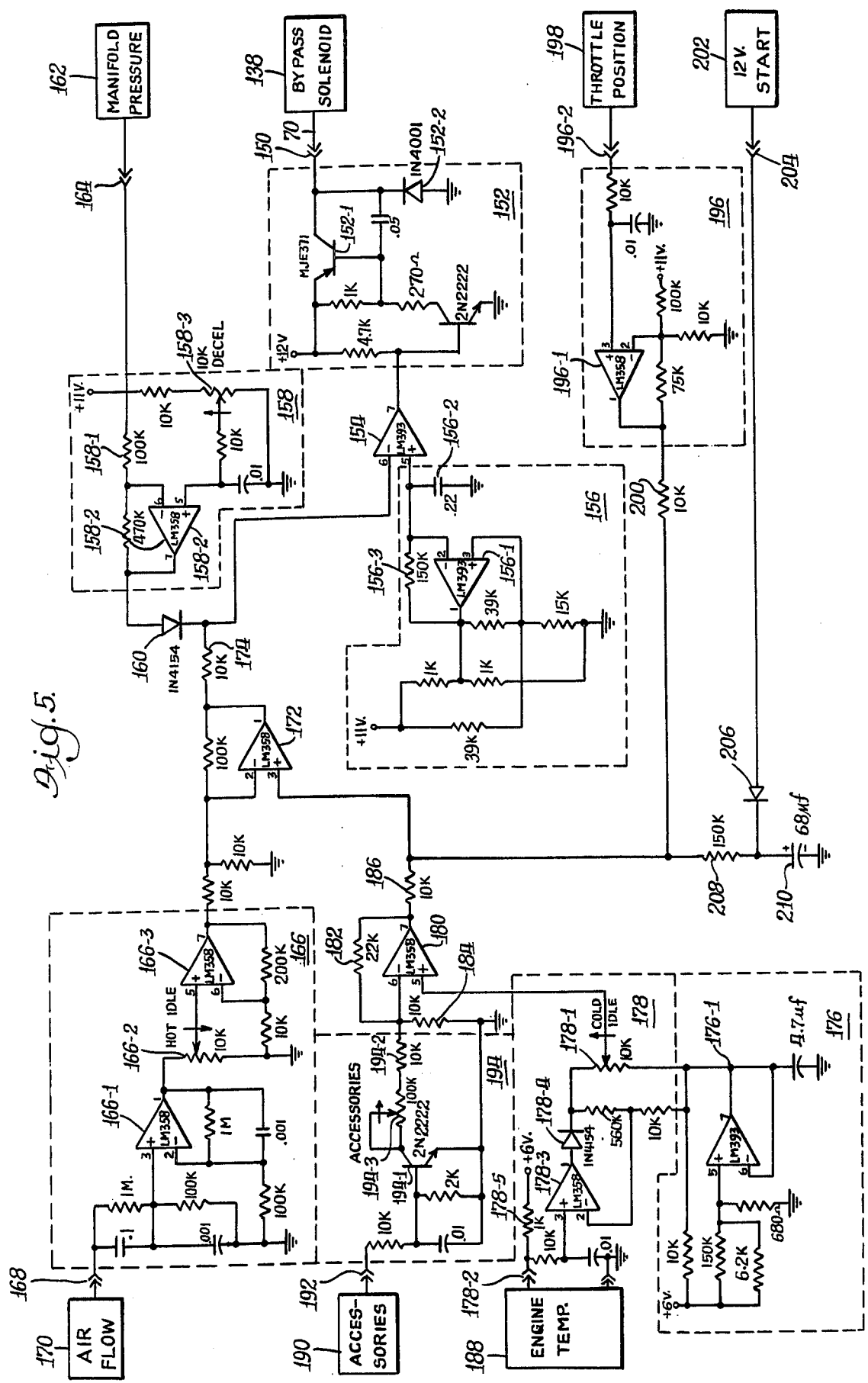

MODULATED THROTTLE BYPASS

The present invention relates generally to an auxiliary air control system bypassing the main throttle valve of an internal combustion engine and more particularly to such system for supplying controlled flow of air to the intake manifold of such engine under certain conditions, notably upon deceleration.

When the throttle of a conventional internal combustion engine of the piston type is suddenly closed while the engine is running at relatively high speed, as in the effort to decelerate rapidly, the pumping action of the pistons of the rapidly turning engine tends to develop a high intake manifold vacuum (low manifold pressure). High intake vacuum has several baleful effects upon engine operation, resulting in improper combustion in the cylinders. One effect is to enrich the air-fuel mixture in the cylinders excessively. This effect is a result of impoverishment of the oxygen supply at low pressure with an increase of fuel supply occasioned by the same low pressure. The increased fuel supply comes from fuel normally accumulated on the interior surfaces of the intake manifold, which fuel is boiled off at the lowered manifold pressure. Even if the cylinders fire, the overly rich air/fuel ratio results in undesirably high emissions of hydrocarbons and carbon monoxide. A second effect is poor combustion occasioned by the pressure being so low that combustion does not propagate properly, again resulting in excessive undesirable emissions. A third effect is poor combustion occasioned by the increased backflow of exhaust through the exhaust valve by reason of the relatively low manifold pressure, also resulting in undesirable emissions.

These problems are created by the rapid closing of the main throttle while operating at high speed. If the throttle is closed relatively slowly so that the engine slows down gradually, by the time the main throttle reaches its closed position (which is normally a position admitting air for idling), the engine is turning over so slowly that a high vacuum is not developed in the intake manifold and the above problems do not arise. However, in the normal operation of an automobile, sudden deceleration is frequently essential. The operator suddenly takes his foot from the accelerator pedal controlling the throttle, causing the throttle to close rapidly, and then applies the brakes.

To assure air flow upon rapid deceleration, it has been the practice to provide a delay in the response of the throttle to release of the accelerator pedal, thus permitting braking and slowing of the engine before the throttle reaches its closed position. This delay has been achieved by coupling the accelerator pedal to the throttle by way of a dashpot which acts to retard the last increment of closure.

Another device that has been used to assure sufficient air upon deceleration is a so-called "gulp" valve. The gulp valve is an aneroid device operating mechanically under the control of a change in pressure to delay pressure changes in the intake manifold.

These prior devices provide only approximate solutions of the problems as they are merely delay devices and are not directly responsive to the condition being controlled. The present invention, however, provides a modulated bypass valve that is controlled in respect to appropriate measured parameters to assure the desired air flow conditions that meet the problems.

Further, in its preferred embodiment, the modulated bypass throttle system of the present invention provides controlled air flow under various engine conditions, as for idle, hot or cold, and for providing additional air when faster idle is desired, as when an air conditioner is used. Conventionally, air flow at engine idle is set by manual adjustment by a service mechanic of the closed position of the main throttle. A fast-idle, solenoid-actuated valve conventionally provides additional air when fast-idle is desired.

Thus, a principal object of the present invention is to provide a modulated bypass throttle system for automatically controlling the rate of air flow into the intake manifold of an internal combustion engine, in particular to assure appropriate rate of air flow upon deceleration. A further object is to provide such system for assuring appropriate rate of air flow under certain operating conditions, as for idle, hot or cold.

Various other objects and advantages of the present invention will become apparent from consideration of the following detailed description, particularly when taken in conjunction with the accompanying drawings in which:

FIG. 5 is a schematic diagram of the electronic circuitry for providing a control signal for the modulated throttle bypass valve shown in FIG. 2.

The present invention is particularly useful in internal combustion engines having air-fuel control systems wherein fuel is supplied in metered amounts providing a particular desired ratio of air to fuel for engine operation. In such systems, air flow to the intake manifold of the engine is controlled and measured, and air flow rate, usually in conjunction with other parameters, is used to develop a control signal used for providing fuel at the desired air/fuel ratio. Thus, the present invention may be utilized in fuel control systems such as that described in U.S. Pat. No. 3,817,225, issued June 18, 1974 to Jack C. Priegel.

Figure 1:
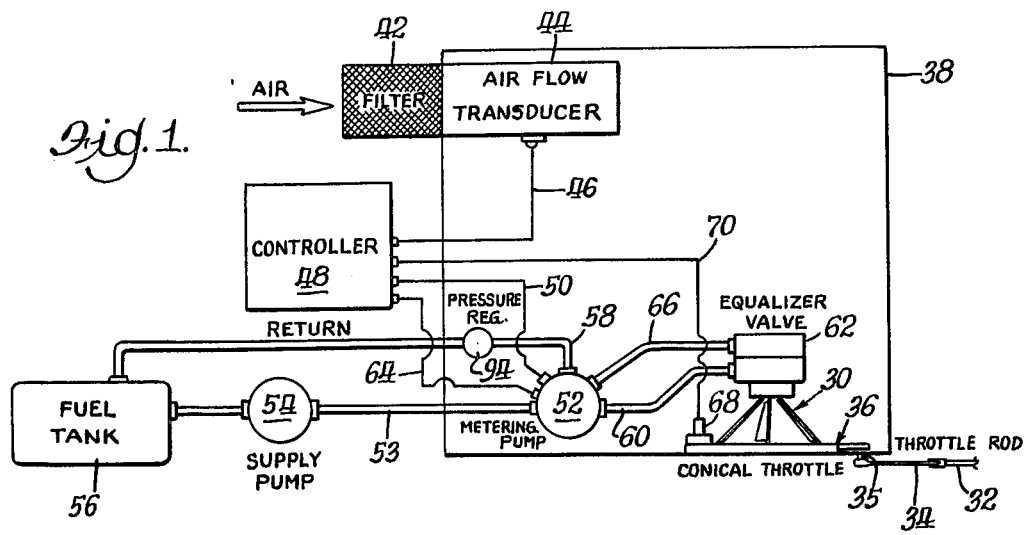
FIG. 1 is a diagrammatic illustration of a controlled air-fuel system for an internal combustion engine utilizing the modulated throttle bypass system of the present invention.

In FIG. 1 there is illustrated very generally an air and fuel control system like that shown by Priegel for supplying an appropriate mixture of air and fuel to the intake manifold of an internal combustion engine, which system has been modified, among other things, to utilize the modulated bypass throttle system of the present invention.

More particularly, the system of FIG. 1 includes a carburetor 30 which, as shown, is preferably conical. As a principal function of the carburetor 30 is to control the rate of flow of air to an intake manifold of an engine, the conical carburetor 30 is sometimes referred to as a conical throttle. The opening of the conical throttle 30 is controlled by a throttle rod 32 which may be connected, for example, to a conventional automobile accelerator pedal. The throttle rod 32 may be connected through a crank 34, a shaft 35 and gears 36 to control the throttle opening and hence the rate of flow of air into the intake manifold. As this is the principal air flow and as the throttle 30 is the throttle by which the operator controls engine speed, the throttle 30 may also be referred to as the main throttle. The throttle 30 is enclosed in a housing 38 which fits over the intake manifold 40 of an internal combustion engine, as better seen in FIG. 2, with the interior of the housing 38 being open to the intake manifold 40 through the carburetor 30. The throttle control linkage passes through the housing 38 at the shaft 35.

All air flowing into the intake manifold flows through the housing 38, flowing into the housing through a filter 42 and an air flow transducer 44. The air flow transducer 44 measures the rate of air flow into, and hence out of, the housing 38 by producing a systematically related electrical signal on a conductor 46 which goes to an appropriate controller 48. The controller 48 may receive other signals from other sensors, such as temperature and pressure sensors, and may operate generally like the controller described in Priegel U.S. Pat. No. 3,817,225, utilizing the various signals to provide an appropriate fuel control signal on a conductor 50 to a metering pump 52.

The metering pump 52 is supplied with fuel through a conduit 53 by a supply pump 54 from a fuel tank 56 with any excess fuel being returned to the fuel tank 56 through a return conduit 58. The metering pump 52 supplies fuel to the carburetor 30 through a conduit 60 and an equalizer valve 62. A feedback signal indicative of pump speed is applied over a conductor 64 to the controller 48, which utilizes the feedback signal to assure that the metering pump operate at the desired speed. Reference pressure is applied to the equalizer valve 62 through a conduit 66.

Also illustrated generally in FIG. 1 is a bypass throttle 68 which, in accordance with the present invention, operates as an auxiliary air control for admitting a controlled additional amount of air into the intake manifold 40, as may be called for by a signal developed in the controller 48 and applied to the bypass throttle over a conductor 70, as will be described in greater detail below.

It should be noted that each of the conductors 46, 50, 64 and 70, shown as a single line in FIG. 1, may comprise a pair of conductors to provide a return path for completion of the respective signal circuit.

Figure 2:
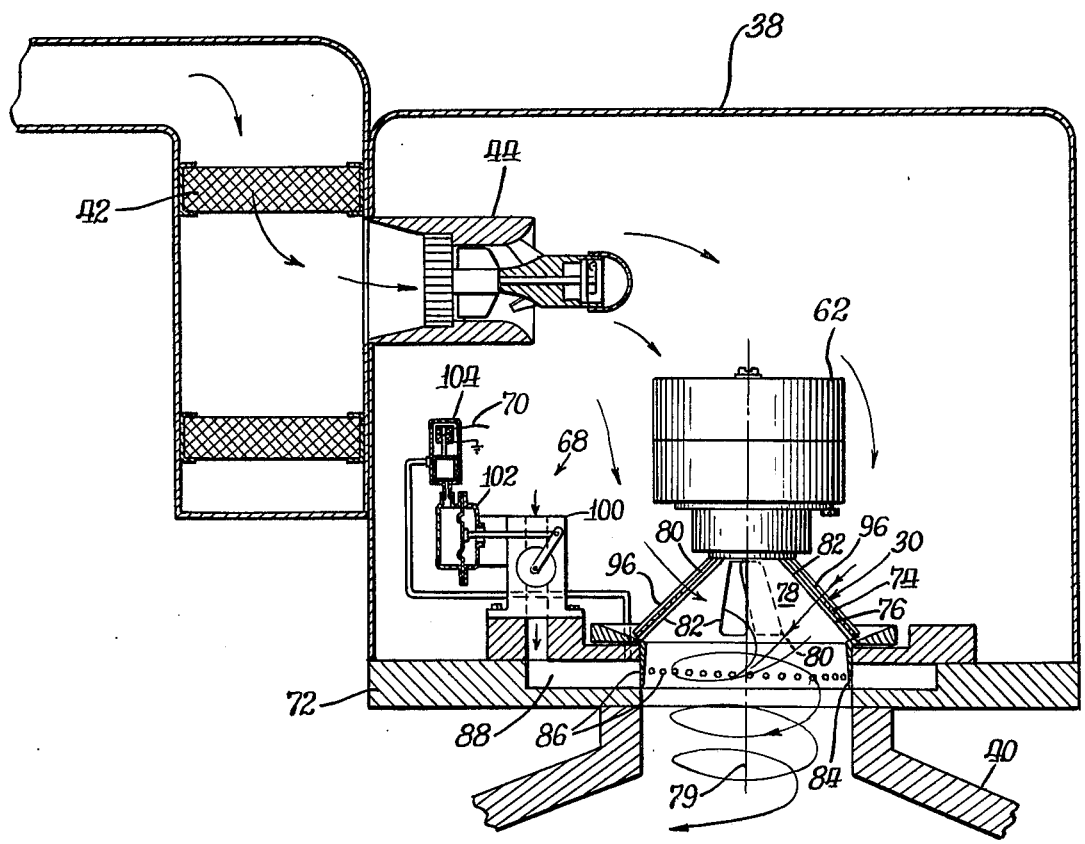
FIG. 2 is a vertical sectional view of the air flow system shown generally in FIG. 1.

As shown more particularly in FIG. 2, the housing 38 includes a base 72 which is mounted on the intake manifold 40 and on which the carburetor 30 is mounted, with the outlet of the carburetor 30 directly over the inlet to the intake manifold 40. The carburetor 30 is formed of a pair of valve members 74 and 76. The valve members 74 and 76 are preferably in the form of conical shells, as illustrated, and hence may be referred to as the outer cone 74 and inner cone 76, respectively. Both cones are hollow, the inner surface of the inner cone 76 forming a mixing chamber 78 wherein fuel and air are mixed.

The inner cone 76 is rigidly fastened to the base 72; whereas the outer cone 74 is rotatably mounted above the inner cone 76 with the inner cone nesting in the outer cone. That is, the outer surface of the inner cone 76 and the inner surface of the outer cone 74 are formed as surfaces of revolution about an axis 79 which, in the case of the carburetor illustrated, is a vertical axis down the centers of the cones. The outer cone 74 may thus be rotated about this axis relative to the inner cone 76 by operation of the throttle rod 32. To facilitate relative rotation, the outer cone may be mounted on bearing surfaces, keeping the mating surfaces slightly spaced from one another, reducing likelihood of binding. The inner cone is made fixed because it is fully exposed to the manifold vacuum, and the outer cone is relatively gently held against the inner cone by the relative pressures on the two sides of the outer cone. Were the outer cone fixed, the inner cone would be pulled away therefrom by the manifold vacuum, requiring additional means, such as a spring, to hold them together to limit air leakage between the cones.

The outer cone 74 includes a plurality of first openings 80 which are substantially identical to one another and are equally spaced around the axis of the cone 74. The inner cone 76 has a plurality of second openings 82 corresponding to the first openings in the outer cone whereby, when the cones are rotated relative to one another, the amount of overlap of the respective openings changes.

The inner cone 76 terminates in a skirt section 84 perforated by holes 86 that furnish passage for air between a channel 88 in the base 72 and the interior of the inner cone 76. The holes 86 and the channel 88 provide passages for air flowing through the bypass throttle 68.

The disclosed fuel feed system supplies fuel at a metered rate from the reservoir or fuel tank 56 to the overlapping first and second openings 80 and 82 of the carburetor 30. Fuel is pumped from the fuel tank 56 by the supply pump 54 and thence through the conduit 53 to the inlet to the metering pump 52, where it may pass through a filter. The fuel pumped by the supply pump 54 to the metering pump 52 that is in excess of the demand of the pump 52 passes on to the return conduit 58, whence the excess fuel returns to the fuel tank 56 through a pressure regulator valve 94. The pressure regulator valve 94 regulates the fuel pressure at the inlet side of the metering pump 52, maintaining such pressure sufficiently high as substantially to preclude the formation of bubbles in the fuel. Pressures in excess of 30 psi have proven satisfactory, for example, about 40 psi. Bubbles are undesirable, as they displace liquid and hence would make the metering pump non-linear. The inlet pressure is applied through the conduit 66 to one side of the equalizer valve 62. The metering pump 52, which may be a gear pump, supplies fuel at a metered rate through the conduit 60 to the other side of the equalizer valve 62 and thence through rails 96 and the overlap of the openings 80 and 82 into the mixing chamber 78 in the interior of the conical throttle 30.

The rate at which the metering pump 52 operates is determined by the speed of a metering pump motor which drives the metering pump 52 itself. The speed of the motor is controlled by the power supplied to the pump motor from the controller 48 over the conductor 50. The speed at which the pump motor and, hence, the metering pump 52 operate is measured by a tachometer which produces a signal on the conductor 64 which indicates pump speed.

The metering pump 52, particularly when used with the equalizer valve 62, operates to pump liquid at a rate proportional to the speed of the pump; hence the signal indicative of motor and pump speed is a measure of rate of fuel flow. This signal is applied as a feedback signal to the controller 48. The controller 48 may operate as the controller disclosed in the aforesaid Priegel U.S. Pat. No. 3,817,225 to compare a signal dependent upon air flow with the feedback signal to produce a driving signal to the pump motor over the conductor 50 to supply fuel to the rails 96 at the appropriate air/fuel ratio for which the controller is programmed.

Figure 3:
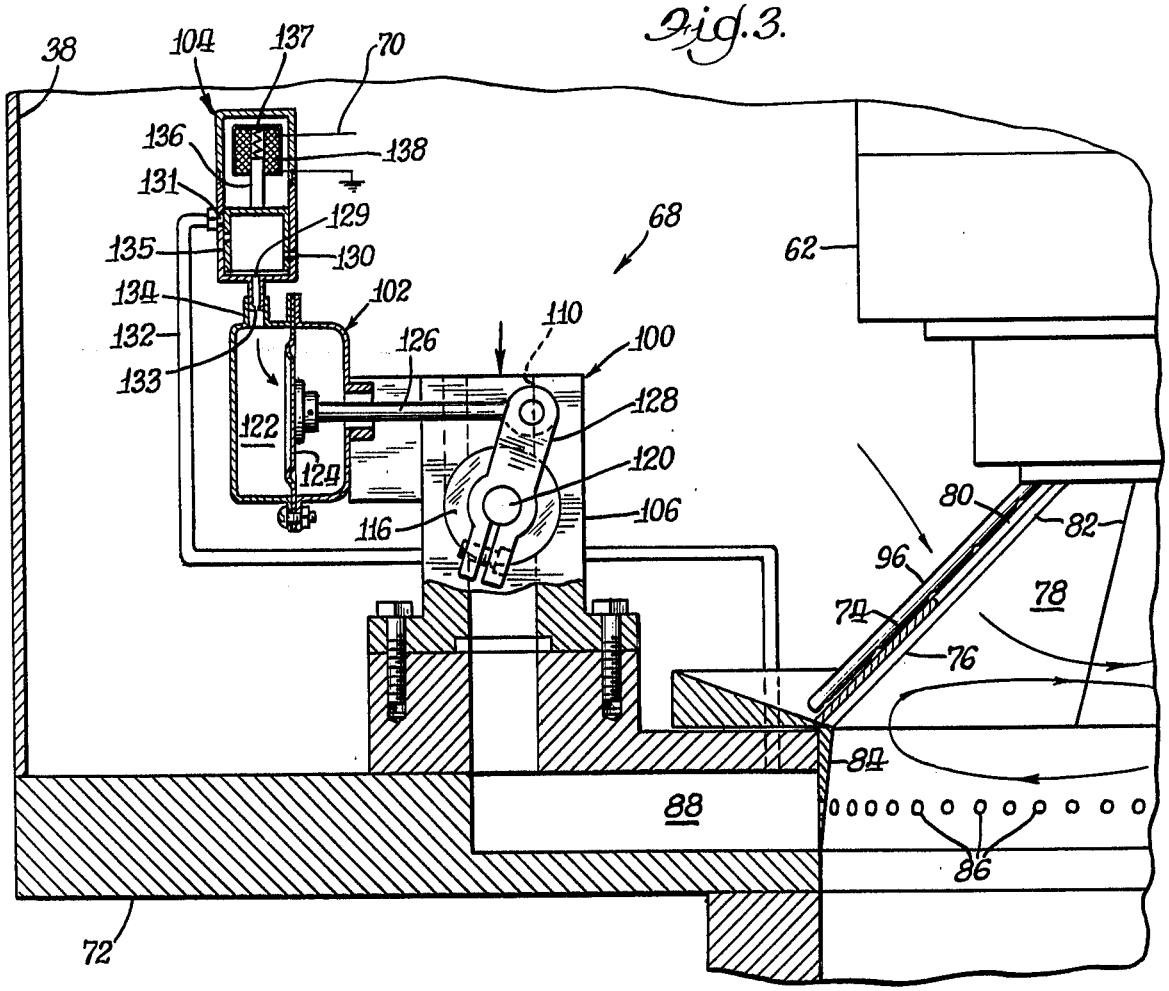
FIG. 3 is an enlarged sectional view of the modulated throttle bypass valve shown in FIG. 2, with its associated operating apparatus.
Figure 4:
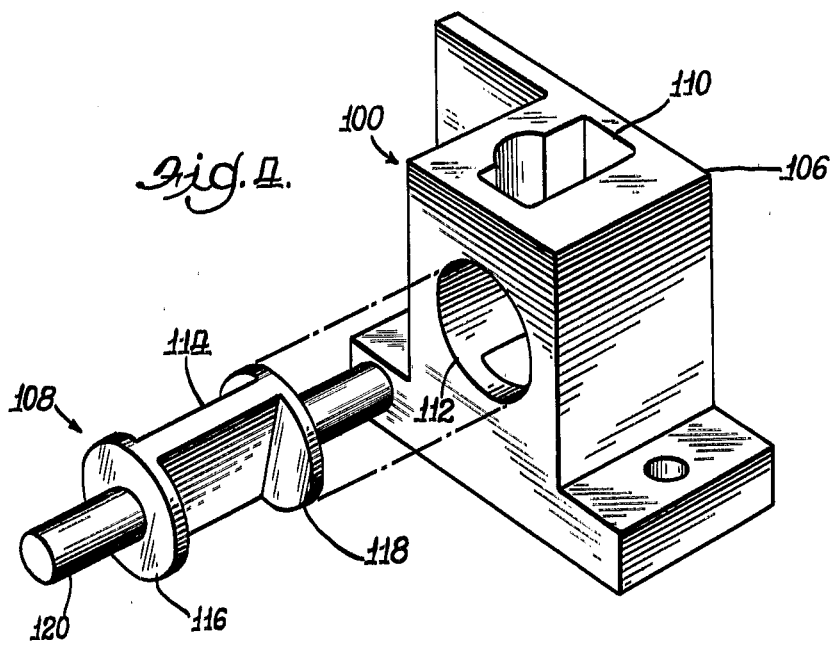
FIG. 4 is an enlarged, exploded view of the auxiliary air valve itself shown in FIG. 2.

The auxiliary air control system of the present invention includes both mechanical and electronic parts. FIGS. 3 and 4 show details of a preferred form of the mechanical components of the bypass throttle 68. FIG. 5 shows a preferred form of the electronic circuitry for controlling the bypass throttle 68. As shown in FIG. 3, the bypass throttle 68 has three important components, an auxiliary air valve 100, a vacuum-actuated valve driver 102 and a solenoid-actuated valve 104.

The auxiliary air valve 100, as shown in greater detail in FIG. 4, is formed of a valve body 106 and a valve closure member 108. The valve body 106 has two intersecting bores 110 and 112. The bore 110 is an air passage connecting the interior of the housing 38 with the channel 88. The closure member 108 is mounted in the bore 112. The closure member 108 has a plate 114 for controlling the air flow through the bore 110. End pieces 116 and 118 are circular and fit snugly in the bore 112 to close the ends of the bore 112 while permitting the closure member 108 to be rotated in the bore 112 to vary the constriction of the bore 110 by the plate 114.

The valve closure member 108 is rotated by rotation of its shaft 120 by the vacuum actuated valve driver 102. The valve driver 102 includes a chamber 122 closed on one side by a diaphragm 124. The side of the diaphragm 124 away from the chamber 122 is open to the interior of the housing 38. As the pressure in the housing 38 is substantially atmospheric pressure, the pressure in the chamber 122 determines net pressure force on the diaphragm. The diaphragm has a restoring force urging the diaphragm to a rest position. The restoring force may be produced by the resiliency of the diaphragm itself. The position of the diaphragm 124 is therefore determined by the pressure in the chamber 122. The diaphragm 124 is connected by a linkage 126 to a crank 128 which turns the shaft 120 to a position determined by the pressure in the chamber 122.

The pressure in the chamber 122 is in turn determined by the solenoid-actuated valve 104. The valve 104 may be a spool valve or the like whereby a port 129 is connected to one of two ports 130 and 131. The port 131 is connected by tubing 132 to the channel 88, whereby manifold vacuum is applied to the port 131. The port 130 is open to the interior of the housing 38. The port 129 is connected through an orifice 133 to tubing 134 leading to the chamber 122. The ports 130 and 131 are opened and closed by movement of a slide member 135 carried by a plunger 136. The plunger is biased in one direction by a spring 137 and is urged in the other direction by the action of a solenoid 138. In the embodiment illustrated, the solenoid 138 acts to apply vacuum to the chamber 122 which causes the diaphragm 124 to turn the valve closure member 108 in the direction to close the auxiliary air valve 100. The solenoid is actuated by a bypass driving signal applied to the conductor 70 by the controller 48, the bypass control circuitry of the controller 48 being illustrated in FIG. 5.

As shown in FIG. 5, the bypass driving signal applied to the conductor 70 is developed at a terminal 150 as a voltage for driving the solenoid 138 of the solenoid-actuated valve 104. This driving voltage is developed in a solenoid driving circuit 152 pursuant to signals from a comparator 154, as occasioned by the signals applied to terminals 154–6 and 154–5, the "−" and "+" terminals, respectively, of the comparator 154. An oscillator 156 applies periodic signals to the terminal 154–5 for interrupting the operation of the driving voltage. The control signal applied to the terminal 154–6 controls the duty cycle of the output at the comparator output terminal 154–7, thereby controlling the power applied to drive the bypass solenoid. That is, the oscillator 156 determines the frequency at which control pulses are applied to the driving circuit 152, and the control signal at the terminal 154–6 determines the length of each pulse. The control signal at the terminal 154–6 therefore effectively controls the operation of the solenoid-actuated valve 104.

In greater detail, the oscillator 156 includes a comparator 156–1 connected as shown with a capacitor 156–2 connected to its "−" terminal. The output of the comparator 156–1 changes state each time the potential on the capacitor 156–2 is charged or discharged to the potential on the "+" terminal of the comparator 156–1. When the capacitor has a lower potential, the output of the comparator 156–1 is high, charging the capacitor 156–2 through a resistor 156–3 until its potential reaches the potential on the "+" terminal, whereupon the comparator switches to a low output state, putting a lower potential on the "+" terminal. The capacitor 156–2 then discharges through the resistor 156–3 until its potential reaches that on the "+" terminal, whereupon the comparator again switches state. The potential on the capacitor 156–2 is therefore a sawtooth wave of a frequency determined by the time constants of the capacitor charging and discharging circuits. A frequency of about 20 hertz has proven suitable.

The sawtooth wave is applied to the "+" terminal 154–5 of the comparator 154. A control signal, developed as described below, is applied to the "−" terminal 154–6. Thus, the output of the comparator 154 is high whenever the sawtooth wave exceeds the control signal and is otherwise low. The output of the comparator 154 is thus a rectangular wave at the frequency of the oscillator 156 and with a duty cycle dependent upon the control signal.

The rectangular signal is applied to the solenoid driving circuit 152 which acts as a power switch. That is, a transistor 152–1 is turned on by the rectangular signal to connect the 12v. power supply to the bypass solenoid 138 at the same frequency for the same duty cycle. A diode 152–2 provides a current path for the current in the solenoid when the transistor 152–1 is turned off, protecting the transistor 152–1.

For emission control on deceleration, a manifold pressure control circuit 158 develops a manifold pressure control signal that is applied through a diode 160 to the "−" terminal 154–6 of the comparator 154, thus providing a control signal for the comparator 154. The manifold pressure control circuit 158 develops the control signal by comparing a signal indicative of manifold pressure with a reference potential. A manifold pressure sensor 162 senses manifold pressure and supplies a signal indicative thereof to the manifold pressure control circuit 158 at a terminal 164. This signal is applied through a resistor 158–1 to the "−" terminal of an operational amplifier 158–2. A reference potential as developed on a potentiometer 158–3 is applied to the "+" terminal of the amplifier 158–2. It is the nature of an operational amplifier connected as illustrated to provide such output at its output terminal as makes the potential at the "−" terminal the same as that on the "+" terminal, except when the signal applied at the "−" terminal exceeds the signal at the "+" terminal. The output of the amplifier 158–2 thus remains low whenever the manifold pressure is so high that the manifold pressure signal as applied to the "−" terminal is greater than the reference signal applied to the "+" terminal, but the output signal goes high to balance the input signals when the manifold pressure signal falls below the reference. The reference signal may be set empirically to correspond to that manifold pressure that it is desired to maintain to avoid too great a manifold vacuum. Thus, when the manifold pressure falls below this level, the operational amplifier 158-2 provides an output control signal that is applied through the diode 160 to control the duty cycle of the comparator 154 to provide a driving signal to the bypass solenoid 138 to open the auxiliary air valve 100. This increases the air flow to the manifold 40, thereby increasing manifold pressure above what it would be with the auxiliary air valve 100 closed. The manifold pressure is sensed by the manifold pressure sensor 162, completing a control loop whereby the auxiliary air valve 100 is driven, up to its limits of full open to full closed, to the position at which the manifold vacuum corresponds to the setting of the potentiometer 158-3.

Another function of the control circuit of FIG. 5 is to provide a control signal at idle. The primary idle control signal is developed in an idle air control circuit 166 in response to an air flow signal applied to an input terminal 168 from an air flow sensor 170. The air flow sensor 170 may comprise more than the air flow transducer 44, which is sensitive to the volume rate of flow of air into the intake manifold 40. As it is mass rate of flow that is significant, the volume rate of flow, as measured by the air flow transducer 44, may be combined with measures of air pressure and air temperature to adjust the signal for density and hence provide a true measure of mass rate of flow. Preferably, the signal as applied to the terminal 168 is thus adjusted to be a true indication of mass rate of air flow into the intake manifold 40. The air flow signal is applied to an operational amplifier 166-1 connected in a feedback loop as shown to provide stability. The output of the amplifier 166-1 is applied to a potentiometer 166-2. The tap of the potentiometer 166-2 is connected to apply a selected portion of the output of the amplifier 166-1 to an operational amplifier 166-3. The output of the amplifier 166-3 is thus a measure of mass rate of air flow, with a signal gain dependent upon the adjustment of the potentiometer 166-2. The output of the idle air control circuit 166 is applied to the "−" terminal of an operational amplifier 172 which operates like the amplifier 158-2 to try to hold the "−" terminal at the level of the "+" terminal. For the moment, it is sufficient to know that under normal conditions of engine idle, with the engine warmed up and idling at closed throttle without accessories on, a normal reference potential is applied to the "+" terminal of the amplifier 172, which reference potential corresponds to a desired rate of air flow under normal idle conditions, taking account of the circuit gain set by the adjustment of the potentiometer 166-2. The output of the amplifier 172 is thus a measure of how far the signal from the idle air control circuit 166 falls short of the reference. This output signal is applied through a resistor 174 to the "−" terminal of the comparator 154. Except when overridden by the manifold pressure control signal from the manifold pressure control circuit 158, this air flow control signal determines the control signal for developing the driving signal applied to the bypass solenoid 138 to control the flow of air through the auxiliary air valve 100. As the air flow sensor 170 measures the rate of total air flow into the intake manifold 40, the air flow sensor 170 closes a feedback loop whereby the auxiliary air valve 100 is driven, again up to its limits of full open to full closed, to the position at which the rate of air flow corresponds to the setting of the potentiometer 166-2 under the assumed normal conditions. As such conditions include an engine that is warmed up, the potentiometer 166-2 may be considered a hot idle control which may be set empirically to assure appropriate air flow for engine idle under these conditions.

The normal reference potential applied to the "+" terminal of the amplifier 172 is developed under normal hot idle conditions from a reference source 176 which develops a suitable fixed potential, e.g., 0.6 v., on its output terminal 176-1. This potential is applied by way of a potentiometer 178-1 in a temperature circuit 178. As will be explained further below, when the engine is warmed up, the potential at the terminal 176-1 is thereby applied to the "+" terminal of an operational amplifier 180 which amplifies the potential with a gain of $1 + R_1/R_2$, where $R_1$ is the resistance of a resistor 182 connected between the output and "−" terminals of the amplifier 180 and $R_2$ is the resistance of a resistor 184 connected between the "−" terminal and ground. The amplified potential is applied through a resistor 186 to the "+" terminal of the amplifier 172 as the reference potential.

The reference potential is modified by the temperature circuit 178 when the engine is cold. An engine temperature sensor 188 is connected between ground and an input terminal 178-2 of the temperature circuit 178. The sensor 188 may be a temperature sensitive diode disposed in the engine coolant, which diode has a negative temperature coefficient whereby the signal at the terminal 178-2 is inversely related to engine temperature. This temperature signal is applied to the "+" terminal of an operational amplifier 178-3. When the engine is hot, the engine temperature signal at the terminal 178-2 is low, less than the fixed potential applied to the "−" terminal of the amplifier 178-3 from the reference source 176. Hence, the output of the amplifier 178-3 remains low and is decoupled from the output potentiometer 178-1 by a diode 178-4, leaving the "+" terminal of the amplifier 180 at the fixed potential of the reference source 176. When the engine cools off, however, the temperature signal at the input terminal 178-2 rises and at some temperature rises above the potential of the source 176, whereupon an amplified signal is applied through the diode 178-4 to the potentiometer 178-1, increasing the potential applied to the "+" terminal of the amplifier 180 and hence the reference voltage for the amplifier 172. The threshold level can be set empirically by selection of the output potential of the reference source 176 or the resistance of a resistor 178-5 through which voltage is supplied to the engine temperature sensor 188. At temperatures below this threshold, the output signal applied to the potentiometer 178-1 rises with decreasing temperature. The potentiometer 178-1 picks off a portion of the signal and hence determines the slope of the output signal as a function of temperature. Thus, at temperatures below the selected threshold, the signal applied to the "+" terminal of the amplifier 180 rises with decreasing engine temperature. This signal is amplified by the amplifier 180 to apply a higher reference potential to the "+" terminal of the amplifier 172 with lower temperatures. A higher reference potential at the "+" terminal produces a higher output from the amplifier 172 and hence a higher control signal at the "−" terminal 154-6 of the comparator 154 with a consequent opening of the auxiliary air valve 100. This assures increased rate of air flow at low engine temperatures, as is desired. As the metering pump 52 supplies fuel to maintain a desired air/fuel ratio, this causes additional fuel to be supplied as well. The circuit may be adjusted empirically for suitable faster idle with the engine cold.

It is also desirable to provide for faster idle when an extra load, such as an air conditioner, is applied at idle, whether the engine is hot or cold. This may be achieved by increasing rate of air flow when such extra load is applied. The application of such load may be sensed by an accessories sensor 190, which may be simply a leaf in the switch turning on an air conditioner. The signal from the accessories sensor 190 is applied through a terminal 192 to an accessories circuit 194. When the accessories signal is applied, a transistor 194-1 turns on putting a resistor 194-2 and a variable resistor 194-3 in a series circuit shunting the resistor 184, reducing $R_2$ in the above equation and hence increasing the gain of the amplifier 180. This raises the signal to the "+" terminal of the amplifier 172 and provides a higher control signal to the comparator 154 and hence further opening of the auxiliary air valve 100, thus supplying more fuel and air for faster idle.

Because the idle air control circuit 166 is part of a feedback loop operating to maintain a constant rate of air flow into the intake manifold, it would, in the absence of further circuitry, operate to frustrate the engine operator when he first opens the main throttle 30. That is, as the main throttle 30 is first opened from its closed position, the idle air control circuit 166 acts to maintain constant total air flow by closing the auxiliary air valve 100 by a corresponding amount, until the auxiliary air valve reaches the end of its range, i.e., is fully closed. To prevent this action, an offsetting signal is provided by a throttle circuit 196. The throttle circuit 196 includes an operational amplifier 196-1 to which a signal indicative of throttle position is applied from a throttle position sensor 198 by way of an input terminal 196-2. The output of the amplifier 196-1 is applied through a resistor 200 to the "+" terminal of the amplifier 172. By empirical selection of the response characteristic of the throttle position sensor 198 and the gain of the amplifier 196-1, the throttle position signal may be used to offset the effect of increased air flow through the main throttle on the idle air control circuit 166 and cause the auxiliary air valve 100 to open with the main throttle 30. This also acts to alleviate the problems of low manifold pressure upon deceleration, for the throttle position circuit 196 assures that the auxiliary air valve 100 is open when the main throttle 30 is open. As a consequence, when the main throttle 30 is suddenly closed, as for deceleration, the auxiliary air valve 100 is already open for admitting extra air to the intake manifold 40. The inertia of the system assures that the auxiliary air valve 100 not close instantaneously even though the signal from the throttle circuit 196 is no longer signalling for an open auxiliary air valve 100. As the auxiliary air valve 100 starts to close, the over-riding signal from the manifold pressure control circuit 158 acts to hold the valve open as necessary to maintain an appropriate manifold pressure.

In addition, it is desirable to supply additional air and fuel upon starting. To this end, a starting sensor 202, which may be the starter switch itself, applies a signal to a terminal 204 by which the signal is applied through a diode 206 and a resistor 208 to the "+" terminal of the amplifier 172. This produces a greater control signal at the "−" terminal 154-6 of the comparator 154 and hence further opens the auxiliary air valve 100. A capacitor 210 stores the start signal to assure that the auxiliary air valve remains open for a time after the starting switch is released. The time delay depends upon the time needed for the charge on the capacitor 210 to discharge through the resistor 208. It may be further noted that before the engine is started, the manifold pressure is at atmospheric pressure, making the pressure in the tubing 132 and hence in the chamber 122 also atmospheric, causing the auxiliary air valve 100 to be wide open before start, assuring a full flow of air at the outset.

In the circuits of FIG. 5, the comparators 154, 156-1 and that in the reference source 176 are identified as LM 393 to indicate an integrated circuit of such type connected as indicated and appropriately connected to a voltage supply. The operational amplifiers 158-2, 166-1, 166-3, 172, 178-3, 180 and 196-1 are similarly identified as LM 358.

Thus, there is provided in accordance with the present invention an auxiliary air control system for an internal combustion engine in which a main throttle 30 is controlled by an engine operator to control the flow of air to the intake manifold 40 of the engine. A modulated bypass throttle 68 controls the flow of air through an auxiliary air passage 110 that bypasses the main throttle 30. The bypass throttle 68 includes a valve member 108 the position of which determines the constriction in the air passage 110 and hence the rate of flow of air through the passage 110 into the intake manifold 40. This air flow adds to flow through the main throttle 30 and is thus the component of the total air flow that is controlled by the auxiliary air control system. As this flow of air into the intake manifold affects the pressure in the intake manifold, the auxiliary air control system also controls manifold pressure. Total rate of air flow into the intake manifold 40 and manifold pressure are measured to provide feedback signals for controlling the position of the valve member 108 to control the rate of air flow through the auxiliary air passage 110.

The present invention provides for the automatic control of two engine parameters, manifold vacuum and rate of air flow at engine idle. Manifold vacuum is controlled by the manifold pressure control circuit 158 wherein the amplifier 158-2 compares the signal from the manifold pressure sensor 162 indicative of manifold pressure with a predetermined reference on the potentiometer 158-3 corresponding to the manifold pressure it is desired to maintain to avoid excessive manifold vacuum. This pressure may be determined empirically for a particular engine operating under particular conditions. More particularly, as automobile emissions are to be controlled up to 55 mph, the air passage 110 is to be opened sufficiently to maintain suitable pressure when the main throttle of an automobile engine is suddenly closed at that speed. A pressure of about 10 in. Hg absolute has been found satisfactory as to emissions. When the manifold pressure falls below the reference level, the gain of the amplifier 158-2 is such that the output of the amplifier rises sharply to apply a control signal to the comparator 154 which is part of the solenoid control circuit for driving the valve member 108 to further open the air passage 110, up to full open, until the manifold pressure is raised to that equal to the pressure to which the reference corresponds. Similarly, when the manifold pressure rises above the reference level, the output of the amplifier 158-2 goes low and the control signal to the comparator 154 causes the solenoid control circuit to drive the valve member 108 to close the air passage 110 until the manifold pressure reaches the reference level. The manifold pressure is thus maintained at the reference level, within the limits of control of the bypass throttle 68, and except as dictated by other control signals applied to the comparator 154, as for controlling the rate of air flow at engine idle.

Air flow at engine idle is controlled primarily by the idle air control circuit 166 which operates upon a signal indicative of rate of air flow, as sensed by the air flow sensor 170, and applies a modified signal to the amplifier 172 which compares the air flow signal with a predetermined reference signal corresponding to a particular rate of total air flow it is desired to maintain. For the basic idle air control the reference signal corresponds to the output of the reference source 176, and the gain of the hot idle potentiometer 166-2 is empirically adjusted so that the particular engine on which the system is used idles properly when warmed up. The output of the amplifier 172 is applied to the comparator 154 of the solenoid control circuit, which operates as described above in connection with the manifold pressure control circuit 158 to position the valve member 108 at such position that the measured air flow corresponds to the desired reference air flow, again within the limits of control and except as dictated by other control signals.

As both the idle air control signal from the amplifier 172 and the manifold pressure control signal from the manifold control circuit 158 are applied to the same comparator 154 to form a valve control signal for controlling the position of the valve member 108, the coupling elements, the resistor 174 and the diode 160, coupling the signals to the "−" terminal of the comparator 154 assure that the valve control signal is the larger of the two signals. Thus, the air passage 110 is open to the wider of the two positions dictated by the respective individual control signals. That is, the rate of air flow is made the greater of the rate of air flow to provide the reference idle air flow and the rate of air flow to provide the reference manifold pressure. This permits full control at idle and for emissions control upon deceleration, as low manifold pressures occur upon deceleration from relatively high speeds and not at engine idle.

As air requirements for engine idle vary with temperature, and specifically are greater when the engine is cold, the temperature circuit 178 provides an increase in the air flow reference signal as a predetermined function of temperature. With the circuit shown, the signal increases with decrease in temperature below a predetermined limit. About 150° F has been found in many automobile engines to be a suitable limit below which additional air is required. The amount of additional air to be added for a particular lower temperature may be set empirically by testing the engine at different temperatures and setting the potentiometer 178-1 appropriately.

Similarly, additional load at idle, such as an air conditioner, requires faster idle or the engine will stall. The accessories circuit 194 therefore responds to turning on of the air conditioner by increasing the air flow reference signal, as it may be modified by the temperature circuit 178, by changing the gain of the amplifier 180. The change in gain may be adjusted empirically by the variable resistor 194-3 so as to provide the predetermined greater reference signal suitable for idling under the additional load.

In order that the engine operator not be frustrated by a dead band in the main throttle control upon accelerating from idle, the throttle circuit 196 also provides for increasing the air flow reference signal at the "+" terminal of the amplifier 172 as a function of main throttle position. The gain of the throttle circuit 196 is preferably made to assure that the auxiliary air valve 100 opens wider as the main throttle is opened, even though the additional air flow would have further closed it in absence of the throttle circuit. This also assures that the auxiliary air valve 100 is fully open at full throttle so as to overcome any excessive manifold vacuum more easily.

To provide additional air and fuel for starting, the 12 v. starting voltage is applied to raise the air flow reference signal at the "+" terminal of the amplifier 172 so high as to assure that the auxiliary air valve 100 is fully opened.

The drive means for driving the valve member 108 includes the solenoid control circuit and a solenoid controlled actuator for positioning the valve member. The solenoid control circuit illustrated includes the comparator 154, the oscillator 156 and the solenoid driving circuit 152. The oscillator 156 produces a signal at a predetermined frequency, for example 20 hertz. The comparator 154 acts in response to the oscillator output on its "+" terminal and the valve control signal on its "−" terminal to produce a rectangular wave signal at the oscillator frequency and positive in each cycle for a time dependent upon the valve control signal. This rectangular wave signal controls the duty cycle of the solenoid driving circuit 152 to produce a similar driving voltage on the conductor 70.

The solenoid controlled actuator includes the crank 128, the linkage 126, the diaphragm 124, the chamber 122 and the solenoid actuated valve 104. The solenoid actuated valve 104 is actuated in response to the solenoid driving voltage received from the solenoid driving circuit 152 over the conductor 70. The solenoid 138 responds to the solenoid driving signal to move the plunger 136 upward at the frequency of the oscillator 156 for the duration of the positive portion of the driving signal. The spring 137 pushes the plunger downward for the remainder of the period. The forces and masses are preferably made such that the plunger 136 is moved relatively promptly from one extreme position to the other, alternately coupling ports 131 and 130 to the port 129. This alternately couples the chamber 122 to manifold vacuum and ambient pressure, respectively, through the orifice 133. The orifice is made small so that the flow of air therethrough at the pressure differences provided is small in each cycle of the valve 104 relative to the volume of the chamber 122. This effectively integrates the pressures which the valve 104 applies to the orifice 133 so that the pressure in the chamber 122 remains relatively constant at the average applied pressure, moving slowly as the average changes with changes in the valve control signal. The diaphragm 124 has a spring force returning it to a rest position from which it is moved by the difference in pressure between the pressure of the chamber 122 on one side and ambient air pressure on the other side. The diaphragm position then determines the rotation of the valve member 108 as will provide the appropriate rate of air flow as balances the effective controlling circuit.

While a particular preferred embodiment of the auxiliary air control system of the present invention has been described in detail, for particular operating conditions of an automobile engine to meet particular emissions standards, various modifications may be made in the system within the scope of the invention to meet these or other conditions and standards.

What is claimed is:

1. An auxiliary air control system for an internal combustion engine having an intake manifold to which the flow of air is controlled by operation of a main throttle valve operated by an engine operator, said system comprising means defining an air passage bypassing said main throttle valve through which air may pass to said intake manifold without passing through said main throttle valve, valve means for controlling the flow of air through said air passage, said valve means including at least one valve member mounted for movement to control opening of said air passage for controlling air flow therethrough, and drive means responsive to a valve control signal for driving said valve member to move to a controlled position in said air passage, and control means including a manifold pressure sensor responsive to manifold pressure by producing a manifold pressure signal systematically related to manifold pressure, means for establishing a manifold pressure reference signal corresponding to a predetermined manifold pressure, means responsive to said manifold pressure signal and said manifold pressure reference signal by producing a manifold pressure control signal for causing said drive means to drive said valve member to the controlled position whereat air flow through said air passage produces a sensed manifold pressure corresponding to said predetermined manifold pressure, and means for applying said manifold pressure control signal to said drive means as said valve control signal.

2. An auxiliary air control system according to claim 1 wherein said control means is additionally responsive to the position of said main throttle valve to provide a valve control signal for opening said air passage in direct relationship to the opening of said main throttle valve.

3. An auxiliary air control system according to claim 1 wherein said control means further includes an air flow sensor responsive to the total flow of air into said intake manifold by producing an air flow signal systematically related to the rate of total air flow into said manifold, means for establishing an air flow reference signal corresponding to a predetermined rate of total air flow into said manifold, and means responsive to said air flow signal and said air flow reference signal by producing an air flow control signal for causing said drive means to drive said valve member to the controlled position whereat air flow through said air passage produces a sensed total rate of air flow into said manifold corresponding to said predetermined rate of air flow, and wherein said means for applying said manifold pressure control signal to said drive means includes means for selectively applying to said drive means as said valve control signal whichever one of said manifold pressure control signal and said air flow control signal produces the greater opening of said air passage.

4. An auxiliary air control system according to claim 3 wherein said means for establishing said air flow reference signal includes means responsive to the temperature of said engine for varying said air flow reference signal as a predetermined function of temperature to provide a reference corresponding to a greater air flow when the engine temperature is below a predetermined temperature.

5. An auxiliary air control system according to claim 4 wherein said means for establishing said air flow reference signal includes means responsive to the application of additional load on the engine for varying said air flow reference signal to provide an air flow reference signal corresponding to a predetermined greater air flow.

6. An auxiliary air control system according to claim 3 wherein said means for establishing said air flow reference signal includes means responsive to the position of the main throttle valve for varying said air flow reference signal as a predetermined function of main throttle valve position to provide an air flow reference signal that increases with increased opening of the main throttle valve.

7. An auxiliary air control system according to claim 3 including means for opening said air passage at starting said engine.

8. An auxiliary air control system according to claim 7 wherein said means for opening said air passage at starting includes means responsive to manifold pressure for urging said valve member to its full open position in the absence of manifold vacuum.

9. An auxiliary air control system according to claim 7 wherein said means for opening said air passage at starting includes means responsive to starting of the engine for varying said air flow reference signal to correspond to a greater air flow while the engine is being started.

10. An auxiliary air control system according to claim 1 wherein said drive means includes a solenoid control circuit responsive to said valve control signal by producing a solenoid drive signal, and a solenoid controlled actuator responsive to said solenoid drive signal for controlling the position of said valve member.

11. An auxiliary air control system according to claim 10 wherein said solenoid control circuit includes an oscillator for producing an oscillator signal at predetermined frequency, and a solenoid driving circuit responsive to said valve control signal and said oscillator signal by producing said solenoid drive signal at said predetermined frequency with a duty cycle corresponding to said valve control signal.

12. An auxiliary air control system according to claim 10 wherein said solenoid controlled actuator comprises a diaphragm positioned in response to pressure in a diaphragm chamber confined by said diaphragm, a linkage connecting said diaphragm to said valve member for rotation thereof in response to movement of said diaphragm, and a solenoid actuated valve selectively connecting said manifold to said diaphragm chamber to control the pressure in said diaphragm chamber in response to said solenoid drive signal.

13. An auxiliary air control system for an internal combustion engine having an intake manifold to which the flow of air is controlled by operation of a main throttle valve operated by an engine operator, said system comprising means defining an air passage bypassing said main throttle valve through which air may pass to said intake manifold without passing through said main throttle valve, valve means for controlling the flow of air through said air passage, said valve means including at least one valve member mounted for movement to control opening of said air passage for controlling air flow therethrough, and drive means responsive to a valve control signal for driving said valve member to move to a controlled position in said air passage, and control means including an air flow sensor responsive to the total flow of air into said intake manifold by producing an air flow signal systematically related to the rate of total air flow into said manifold, means for establishing an air flow reference signal corresponding to a predetermined rate of total air flow into said manifold suitable for engine idling, means responsive to said air flow signal and said air flow reference signal by producing an air flow control signal for causing said drive means to drive said valve member to the controlled position whereat air flow through said air passage produces a sensed total rate of air flow into said manifold corresponding to said predetermined rate of air flow, and means for applying said air flow control signal to said drive means as said valve control signal.

14. An auxiliary air control system according to claim 13 wherein said means for establishing said air flow reference signal includes means responsive to the temperature of said engine for varying said air flow reference signal as a predetermined function of temperature to provide a reference corresponding to a greater idle air flow when the engine temperature is below a predetermined temperature.

15. An auxiliary air control system according to claim 14 wherein said control means further includes a manifold pressure sensor responsive to manifold pressure by producing a manifold pressure signal systematically related to manifold pressure, means for establishing a manifold pressure reference signal corresponding to a predetermined manifold pressure, and means responsive to said manifold pressure signal and said manifold pressure reference signal by producing a manifold pressure control signal for causing said drive means to drive said valve member to the controlled position whereat air flow through said air passage produces a sensed manifold pressure corresponding to said predetermined manifold pressure, and wherein said means for applying said air flow control signal to said drive means includes means for applying said manifold pressure control signal to said drive means to override said air flow control signal when said manifold pressure falls below said predetermined manifold pressure.

16. An auxiliary air control system according to claim 14 wherein said means for establishing said air flow reference signal includes means responsive to the application of additional load on the engine for varying said air flow reference signal to provide an air flow reference signal corresponding to a predetermined greater idle air flow.

17. An auxiliary air control system according to claim 16 wherein said additional load to the application of which said means is responsive is an air conditioner.

18. An auxiliary air control system according to claim 13 wherein said means for establishing said air flow reference signal includes means responsive to the position of the main throttle valve for varying said air flow reference signal as a predetermined function of main throttle valve position to provide an air flow reference signal that increases with increased opening of the main throttle valve.

19. An auxiliary air control system according to claim 13 including means for opening said air passage at starting said engine.

20. An auxiliary air control system according to claim 19 wherein said means for opening said air passage at starting includes means responsive to manifold pressure for urging said valve member to its full open position in the absence of manifold vacuum.

21. An auxiliary air control system according to claim 19 wherein said means for opening said air passage at starting includes means responsive to starting of the engine for varying said air flow reference signal to correspond to a greater air flow while the engine is being started.

22. An auxiliary air control system according to claim 13 wherein said drive means includes a solenoid control circuit responsive to said valve control signal by producing a solenoid drive signal, and a solenoid controlled actuator responsive to said solenoid drive signal for controlling the position of said valve member.

23. An auxiliary air control system according to claim 22 wherein said solenoid control circuit includes an oscillator for producing an oscillator signal at predetermined frequency, and a solenoid driving circuit responsive to said valve control signal and said oscillator signal by producing said solenoid drive signal at said predetermined frequency with a duty cycle corresponding to said valve control signal.

24. An auxiliary air control system according to claim 22 wherein said solenoid controlled actuator comprises a diaphragm positioned in response to pressure in a diaphragm chamber confined by said diaphragm, a linkage connecting said diaphragm to said valve member for rotation thereof in response to movement of said diaphragm, and a solenoid actuated valve selectively connecting said manifold to said diaphragm chamber to control the pressure in said diaphragm chamber in response to said solenoid drive signal.

* * * * *